(No Model.) 5 Sheets—Sheet 1.
G. WESTINGHOUSE, Jr.
APPARATUS FOR HEATING CARS.
No. 466,590. Patented Jan. 5, 1892.
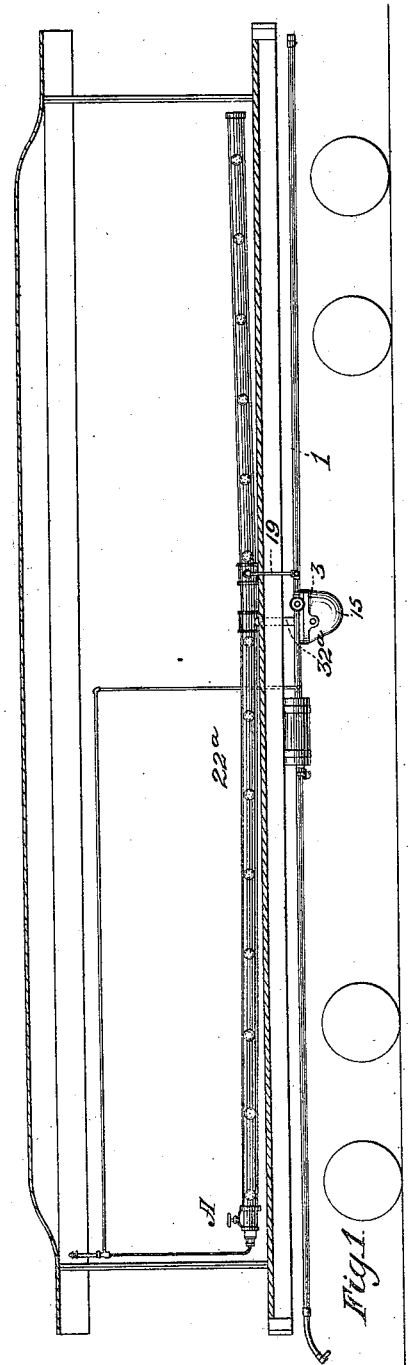
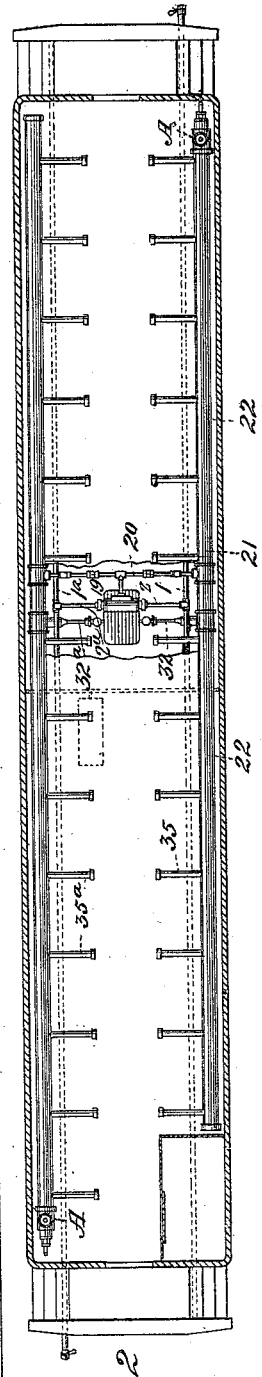
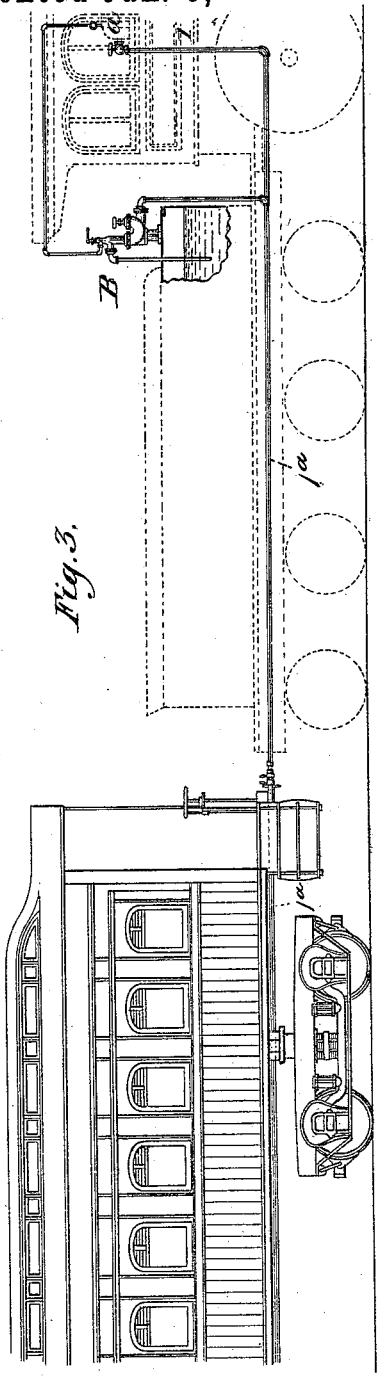
Witnesses:
Inventor.
George Westinghouse Jr
by Darwin S. Wolcott
Atty (No Model.) 5 Sheets—Sheet 2.

G. WESTINGHOUSE, Jr.
APPARATUS FOR HEATING CARS.

No. 466,590. Patented Jan. 5, 1892.

Witnesses:

Inventor:
George Westinghouse Jr
by Darwin S. Wolcott
Atty

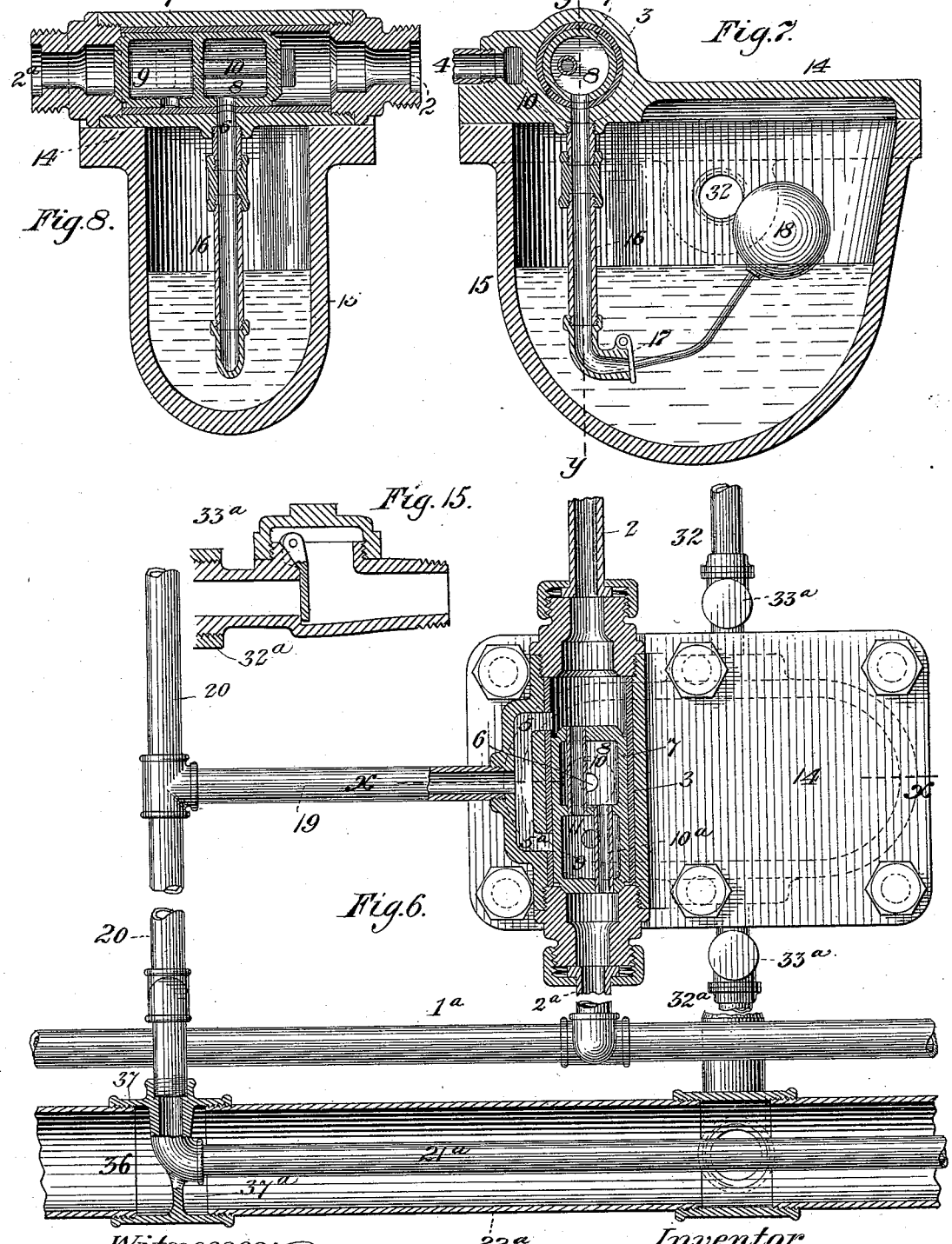

(No Model.) 5 Sheets—Sheet 4.
G. WESTINGHOUSE, Jr.
APPARATUS FOR HEATING CARS.
No. 466,590. Patented Jan. 5, 1892.
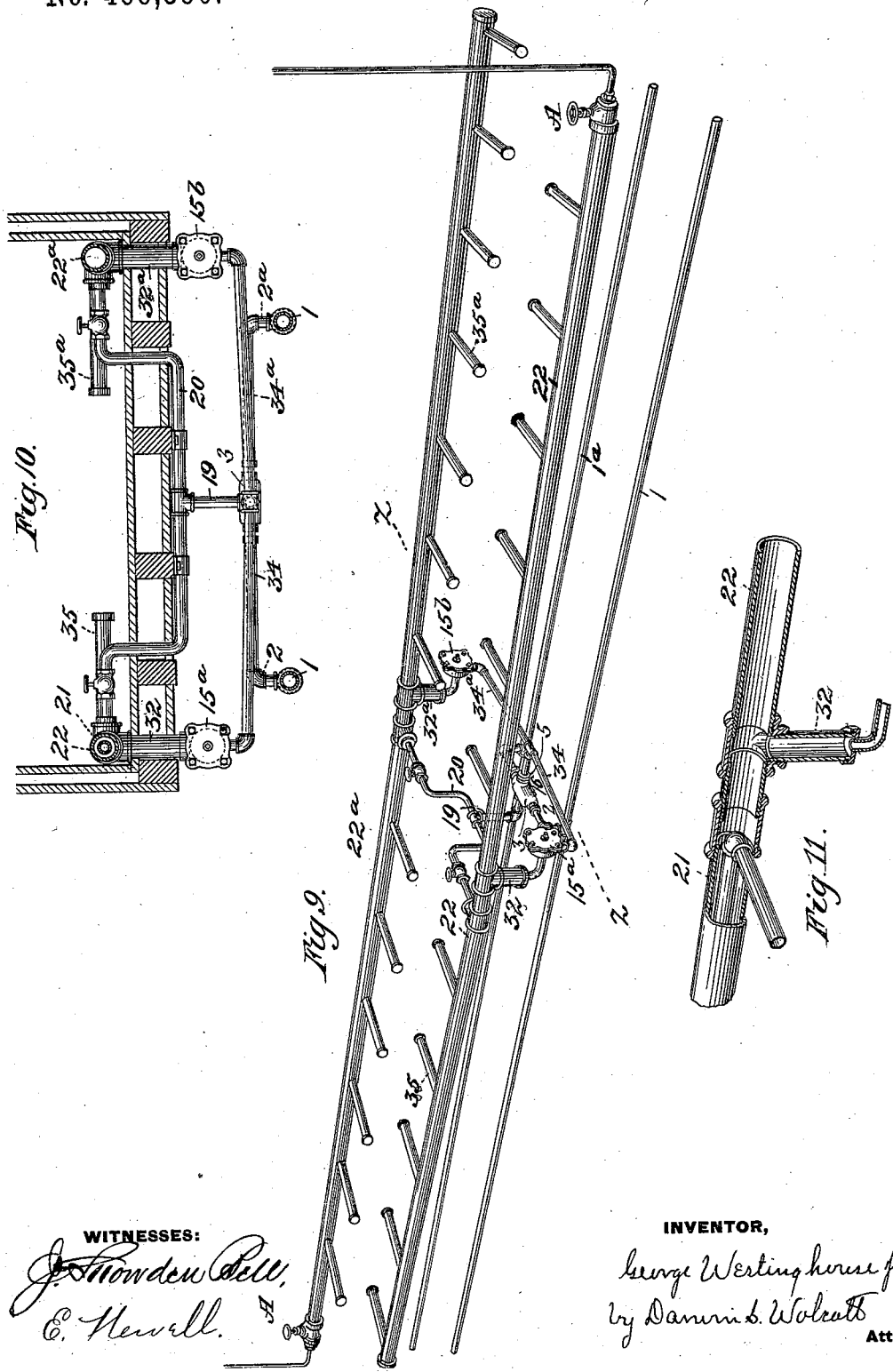
WITNESSES:
INVENTOR,
George Westinghouse Jr
by Daniel L. Wolcott
Att'y.

(No Model.) 5 Sheets—Sheet 5.

G. WESTINGHOUSE, Jr.
APPARATUS FOR HEATING CARS.

No. 466,590. Patented Jan. 5, 1892.

WITNESSES:
J. Snowden Bell,
E. Newell.

INVENTOR,
George Westinghouse Jr.
by Darwin S. Wolcott
Att'y.

THE NORRIS PETERS CO., PHOTO-LITHO., WASHINGTON, D. C.

UNITED STATES PATENT OFFICE.

GEORGE WESTINGHOUSE, JR., OF PITTSBURG, PENNSYLVANIA, ASSIGNOR TO THE STANDARD CAR HEATING AND VENTILATING COMPANY, OF SAME PLACE.

APPARATUS FOR HEATING CARS.

SPECIFICATION forming part of Letters Patent No. 466,590, dated January 5, 1892.

Application filed July 3, 1888. Serial No. 278,958. (No model.)

*To all whom it may concern:*

Be it known that I, GEORGE WESTINGHOUSE, Jr., a citizen of the United States, residing at Pittsburg, in the county of Allegheny and State of Pennsylvania, have invented certain new and useful Improvements in Apparatus for Heating Cars, of which improvements the following is a specification.

My invention relates to what is known as the "continuous car-heating system," in which steam or other heat-containing fluid is caused to flow from a point of supply through a series of heat-distributing devices located in the several cars composing the train and is thereafter returned to the generator or to a suitable receptacle at or near the initial point.

The object of the invention is to provide an apparatus in the operation of which the water of condensation shall be returned to the tank of the engine, thereby obviating the constant wetting of waiting-station platforms, as well as the loss of water and incident waste of heat, and in which the normal operative relation of the devices of the several cars of a train shall be unimpaired by the reversal or turning end for end of any one or more of them.

To this end my invention consists in certain novel combinations of devices, as hereinafter fully set forth and claimed.

Figure 4:
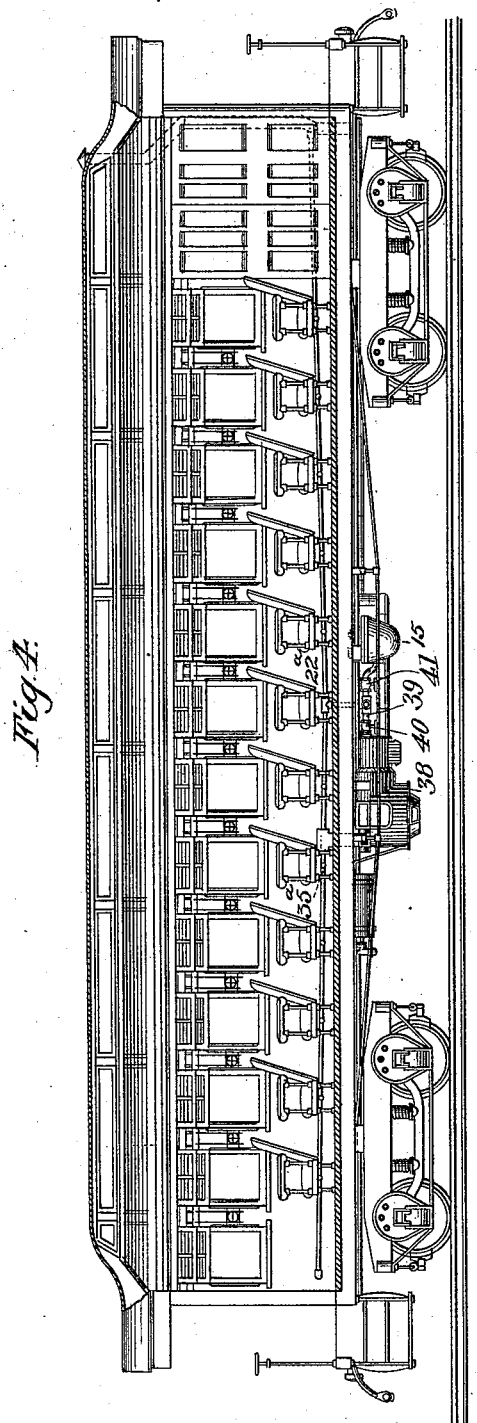
Figure 12:
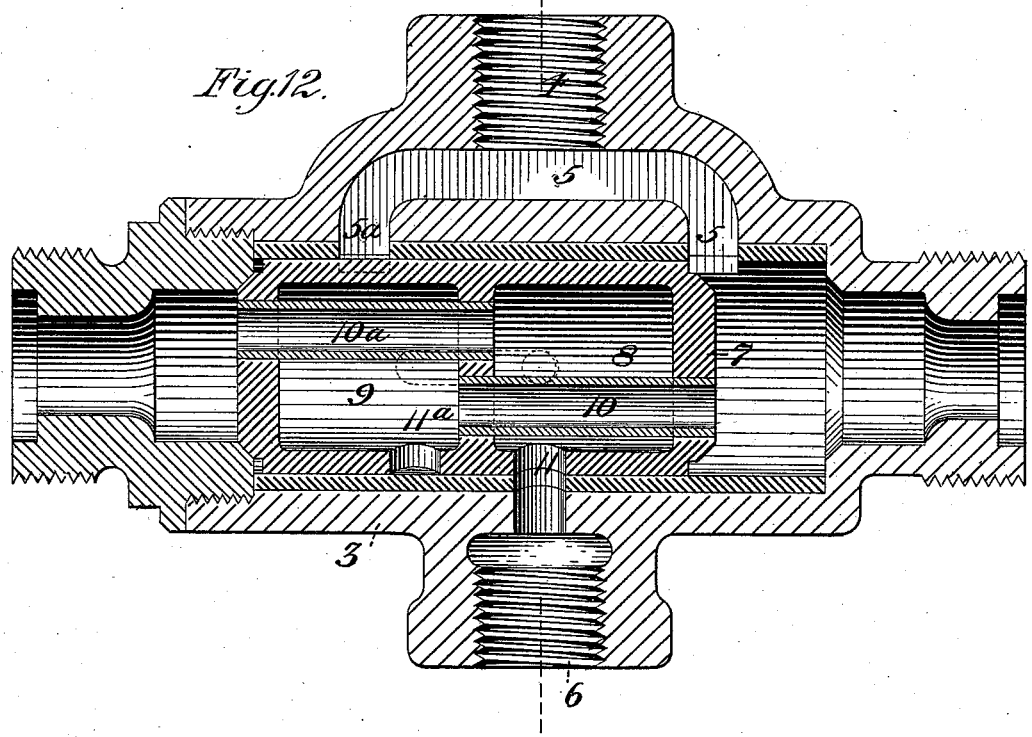
Figure 13:
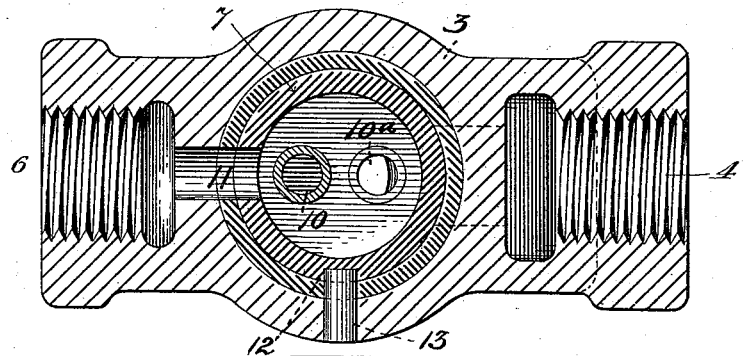
Figure 14:
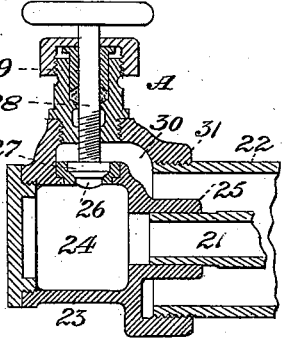

In the accompanying drawings, Figure 1 is a diagrammatic side view of a railroad-car, illustrating an application of my heating system; Fig. 2, a similar view in plan of the same; Fig. 3, a side view illustrating the connections to the boiler and tank of a locomotive; Fig. 4, a vertical longitudinal section, and Fig. 5 a plan view of a railroad-car having my invention applied; Fig. 6, a view, partly in plan and partly in horizontal section, showing portions of one of the main conducting-lines, adjacent distributing-pipe and radiator, and the mechanism which is interposed between the same and the corresponding members on the opposite side of the car; Fig. 7, a vertical section at the line *x x* of Fig. 6; Fig. 8, a similar section at the line *y y* of Fig. 7; Fig. 9, a view in perspective, illustrating a modification of certain details of my heating apparatus; Fig. 10, a transverse section through the same at the line *z z* of Fig. 9, showing also a portion of the car-body; Fig. 11, a perspective section of a portion of one of the heat-distributers or radiators; Figs. 12 and 13, longitudinal and transverse sections, respectively, through the valve mechanism shown in Fig. 9; Fig. 14, a longitudinal section through the connection between the conducting and radiating pipes, and Fig. 15 a section through one of the check-valves of the branches connecting the trap and radiators.

In the practice of my invention two lines of conducting-pipe 1 and $1^a$ are located below the floor and near the sides of each car, as shown in Figs. 1, 2, 3, 9, and 10, said lines being adapted to be connected at their ends to similar lines of pipe on adjacent cars or on a tender or tank engine by suitable couplings. One end of one of the conducting-lines of the car or series of cars to be heated, as the line 1, is connected to a fluid-heating apparatus, which is preferably, as shown, the boiler of the locomotive-engine hauling the train, the supply of steam therefrom to the conducting-line being controlled by a suitable valve *a*. The adjacent end of the opposite line $1^a$ is connected to any suitable apparatus adapted for exhausting fluid from said line, said apparatus being in this instance an ejector-condenser B, such as is commonly employed for creating a partial vacuum on the exhaust side of steam-engine pistons. The ejector-condenser, which is located on the tender of the engine, is supplied with steam from the boiler and in operation serves to draw the steam and water of condensation from the conducting-line with which it communicates and the traps connected thereto and to maintain a partial vacuum, thereby facilitating the circulation of the heating-fluid. The construction and operation of ejector-condensers being well known to those skilled in the art and this special form of exhauster not constituting in and of itself part of my present invention, such construction need not be herein at length set forth. It will thus be seen that the connected series of cars to be heated is provided with a supply and an exhaust line of conducting-pipe.

The appliances by which heat is imparted to the cars and communication established and maintained in the operation of the system between the supply-line and radiators and between the radiators and the exhaust-line will now be described. The conducting-lines 1 and 1ᵃ of each car are provided at or near the middle of its length with branches 2 and 2ᵃ, respectively, which are connected to opposite ends of a valve mechanism having a valve case or chamber 3, which is preferably formed of brass or brass-lined and is provided with an outlet 4, communicating by ports 5 and 5ᵃ with its opposite ends, and also provided with an inlet 6 at or near its center. The ports 5 and 5ᵃ of the outlet and the inlet 6 are controlled by a reversible valve 7, which in the instance shown is of the piston type and is provided with compartments 8 and 9, which communicate with the ends of the valve-chamber opposite those which they respectively adjoin by ports 10ᵃ and 10, respectively—that is to say, the upper valve-compartment 8, referring to Fig. 6, communicates by the port 10ᵃ with the lower end of the valve-chamber 3 and the lower compartment 9 communicates by the port 10 with the upper end of the valve-chamber. The valve-compartments 8 and 9 are further provided with ports 11 and 11ᵃ, which are so located that at the limits of the range of traverse of the valve one or the other of said ports shall register with the inlet-port 6 of the valve-chamber, and thereby establish communication between said inlet-port and the end of the valve-chamber adjoining the valve-compartment whose port 11 or 11ᵃ, as the case may be, is not in communication with the inlet-port 6. To prevent rotation of the valve and insure one of the ports 11 and 11ᵃ being brought into line with the inlet 6 at each terminal of the traverse of the valve, a longitudinal groove 12 is formed in the latter, in which groove there fits a pin 13, secured to the valve-chamber. A similar arrangement of valve-chamber, valve-compartments, and ports to that above described is embodied in the valve of Figs. 12 and 13. The inlet-port 6 is connected with a pipe 16, which extends downwardly into a trap 15, Figs. 7 and 8, and has its lower opening controlled by a valve 17, which is operated by a connected float 18, elevation of the water level in the trap acting to raise the float and open the valve and depression of the water-level effecting the lowering of the float and closure of the valve.

Figs. 1, 2, 4, 5, 6, 7, and 8 illustrate a construction in which the valve-chamber is formed integral with the cap 14 of the trap 15, while in Figs. 9 and 10 two traps 15ᵃ 15ᵇ, each independent of the valve-chamber, are provided, and are connected by pipes 34 34ᵃ with the inlet-pipe 6 of the valve-chamber 3, which in such case is of the form shown in Figs. 12 and 13. The outlet 4 of the valve-chamber 3 is connected by a pipe 19 to a transverse pipe 20, connected at its ends to distributing-pipes 21 21ᵃ, placed, respectively, within heat distributers or radiators 22 22ᵃ, which are located, as shown in Figs. 1 and 2, within the car, near its bottom, and extend along its sides from end to end. The distributing-pipes 21 and 21ᵃ do not run throughout the entire length of the radiators, said pipes extending in opposite directions, respectively, from their points of entrance into the radiators, which are at or near the middle of the length of the latter to or near one end of each radiator.

A valve mechanism A (shown in detail in Fig. 14) is located at one end of each of the radiators, whereby the steam or other heating-fluid from the distributing-pipes 21 and 21ᵃ can be admitted to the radiators 22 and 22ᵃ, either by means of a hand-actuated valve or by mechanism controlled by the heat of the car. Referring to Fig. 14, the valve mechanism A consists of a case or shell 23, within which is formed a chamber 24, connected by a suitable nozzle 25 with the distributing-pipe 21, the chamber 24 being connected with the space 30 between the shell and the wall of the chamber by a port or passage 26, controlled by a valve 27, provided with a threaded stem 28, passing through a stuffing-box 29. By raising the valve 27 steam will pass by the port 26 into the space 30, and thence into the radiator 22, to which the shell 23 is connected and with which the space 30 communicates, the shell 23 being provided with an internally-threaded flange 31, through which the connection of the radiator is effected. The radiators 22 and 22ᵃ are provided with branches 32 and 32ᵃ, which are connected to opposite sides of the trap 15, said branches being provided, respectively, with check-valves 33 33ᵃ, Figs. 6 and 15, which are suitably constructed to prevent the backward passage of fluid from the trap into the branches.

As shown in Figs. 1 and 9, the radiators 22 and 22ᵃ are arranged with their ends elevated above their points of connection with the branch pipes 32 and 32ᵃ, in order that any water that may be condensed in the radiators may flow down into the branch pipes and thence into the trap. If desired, a series of branches 35 35ᵃ may be connected to the radiators, said branches extending outwardly under the seats into the body of the car, thereby increasing the radiating-surface. When such branches are employed, care should be taken that their inner or free ends are slightly elevated, in order that any water that may be derived from condensation therein shall flow down into the main radiators 22 and 22ᵃ.

In the operation of my improved apparatus steam is admitted by the engineer, through the valve a, to the supply conducting-line 1, and, passing along said line under each car, flows by the branches 2 into the valve-chambers 3, and by its pressure therein forces the valves 7 to the limit of their traverse in the direction of the opposite conducting-line 1ᵃ, as shown in Figs. 6, 8, and 12, thereby opening the ports 5 and closing the ports 5ᵃ. The steam then passes by the pipes 19 and 20 into the distributing-pipes 21 and 21ᵃ, thence through the valve mechanisms A at the ends thereof into the radiators 22 and 22ª, and thence back through the branch pipes 32 and 32ª into the traps 15. If sufficient water has collected in the traps to raise the floats 18 and open the connected valves 17, the fluid is drawn from the traps by the operation of the ejector-condenser B on the tender, up through the pipes 16 and inlet-ports 6 into the valve-compartments 8, thence through the pipes 10ª to the ends of the valve-chambers 3, adjoining the outer ends of said pipes, and thence through the pipes 2ª and conducting-line to and through the ejector-condenser and into the tank of the engine.

The arrangement of the conducting-pipes 1 and 1ª and the reversible-valve mechanism, as hereinbefore described, admits of the connection of either end of a car with the engine or with another car of the series to be heated, it being immaterial which one of the conducting-pipes 1 and 1ª of the car is connected to one of the conducting-pipes on the engine, as the employment of a reversible-valve mechanism enables the line which has previously acted as a supply-line to serve as the exhaust-line, and vice versa. Thus, for example, if an engine should be connected to the left-hand end of the car, (shown in Fig. 2,) the right-hand end of which had theretofore been connected to or nearest the engine in the series, the conducting-pipe 1ª of said car, which had theretofore been the exhaust-line, would be connected with the supply-line 1, leading from the boiler, and the conducting-pipe 1 of the car, which had theretofore been the supply-line, would be connected with the exhaust-line 1ª, leading to the ejector-condenser. The steam then passes through or along the pipe 1ª of the car, thereby shifting the valve 7 to the extremity of its traverse opposite to that at which it is shown in Figs. 6, 8, and 12, thereby permitting steam to flow by the ports 5ª, outlet 4, pipes 19 and 20, and distributing-pipes 21 and 21ª to the radiators 22 and 22ª, and also admitting of the passage of water of condensation through the branch pipes 32 and 32ª to the trap 15, and thence by the pipe 16, inlet 6, compartment 9 to the valve 7, tube 10, and pipe 2 to the conducting-line 1 of the car, and thence through the connected exhaust-line to the injector-condenser B and the tank of the engine. If desired, both lines of pipe 1 and 1ª may have a suitable valve connection with the boiler of the engine and with the ejector-condenser, whereby a reversal of the operation hereinbefore described may be effected. The couplings 37, uniting the sections of pipe forming part of the radiators at the points where the pipe 20 enters the same, are each provided with a nozzle 36, formed integral with the coupling, as shown in Fig. 6, a portion of said nozzle projecting outwardly and forming a socket for the reception of one end of the pipe 20 and the inner portion of the nozzle being curved in the direction in which the distributing-pipe 21 or 21ª is to extend and being strengthened or reinforced by a brace 37ª. One end of the distributing-pipe 21 or 21ª is screwed into the curved end of the nozzle 36, and thereby held firmly against movement, the opposite end of the pipe 21 or 21ª being simply slipped into the nozzle 25 of the valve mechanism A, controlling the flow of fluid from the pipe 21 or 21ª to the inclosing radiator, thereby providing for the longitudinal movement of the distributing-pipe, due to expansion and contraction.

Figure 5:
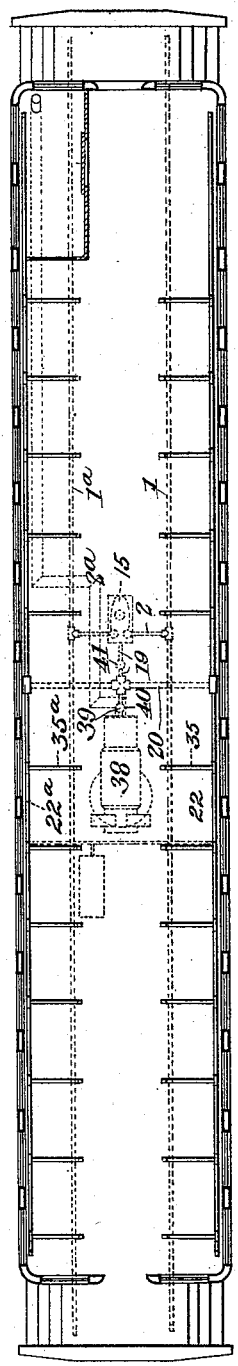

Figs. 4 and 5 illustrate the manner of connecting a separate heater 39 to the radiators within the car for the independent heating of each car. For this purpose the pipe 19 is provided with a valve 41 for cutting off connection with the continuous heating system hereinbefore described, and the pipes 20, leading to the radiators 22 22ª of the car, are connected by a pipe 39, provided with a valve 40, with the steam-chamber of the independent heater 39.

The characteristic feature of my invention consists in two conducting-lines of pipe extending from a radiator to places or points suitable for the supply of steam and the exhaustion of water of condensation, respectively, and a reversible valve mechanism interposed between the conducting-lines and connected therewith and with the radiator for the purpose of affording a supply-passage from either of the conducting-pipes to the radiator and an exhaust-passage from the radiator to the other conducting-pipe.

While preferring the construction of valve mechanism hereinbefore described, I do not wish to limit myself thereto, as the same function may be effected by one valve having suitably-arranged ports or passages or by two or more valves suitably constructed. In fact the valve described might be considered as two valves joined together and operating simultaneously.

I claim as my invention and desire to secure by Letters Patent—

1. In a car-heating apparatus, the combination, with the main supply-pipe and a main return-pipe, of radiators communicating with the pipes and a communicating valve between the pipes, consisting of a casing constructed with a series of communicating compartments and automatically-operating valves between the same, arranged to be opened and closed, respectively, on the admission of steam, whereby either main may be used for return or supply, substantially as described.

2. The combination, with the two train-pipes and radiator-pipes connected therewith, of a valve located between the train-pipes, constructed with a series of chambers into which the supply and return pipes lead, respectively, and steam-operated valves between the valve-chamber, controlling the flow of the steam from the supply-pipe to the radiators and water of condensation from the radiator to the train-pipe, substantially as described.

3. The combination, with the two train-pipes and radiator-pipes communicating therewith, of supply and return pipes, a valve arranged so that the steam opens the communicating valves between certain chambers and closes the communication between the other chambers connected with the train-pipes, consisting of a casing having partitions forming inlet and outlet supply and return chambers, and automatic valves between the chambers, whereby either main may be used to supply or return, substantially as described.

4. A valve consisting of a casing divided interiorly into a series of communicating chambers, pipes leading into the same, and valves arranged to be actuated by the steam-pressure between the chambers, substantially as described.

5. In a car-heating apparatus, the combination of a radiator, two lines of conducting-pipe extending from places or points convenient for the supply of steam and for the exhaustion of water of condensation, respectively, a valve mechanism having suitable connections to said lines of pipe and to the radiator, the valve or valves of such mechanism being adapted to be shifted by steam-pressure introduced through either of said lines of pipe, and a system of ports adapted in either position of the valve or valves to afford a passage-way from the then steam-supply pipe to the radiator and another passage-way from the radiator to the opposite pipe, substantially as set forth.

6. In a car-heating apparatus, the combination of a radiator, two lines of conducting-pipe adapted to be coupled up at either end of the car with suitable connections by one line of pipe to a steam-generator and by the other line of pipe to an ejector-condenser, a valve mechanism having suitable connections to said lines of pipe and to the radiator, the valve or valves of such mechanism being adapted to be shifted in position by steam-pressure through either of said two lines of pipe, and a system of ports adapted in either position of the valve or valves to afford a passage-way from the then steam-supply pipe to the radiator and another passage from the radiator to the opposite pipe, substantially as set forth.

7. In an apparatus for heating cars, the combination of two lines of fluid-conducting pipe, a valve-chamber connected at its ends to said lines of pipe and provided with an outlet and an inlet port, a valve reversible by fluid-pressure in one of the lines of pipe and provided with separate compartments, ports leading to said compartments and arranged in certain positions of the valve to register with the inlet-port, and tubes connecting said compartments with the valve-chamber at opposite ends of the valve, substantially as set forth.

8. In an apparatus for heating cars, the combination of two lines of fluid-conducting pipe, a valve-chamber connected to said lines and to a trap, heat-radiating devices connected to the chamber and to the trap, and a reversible valve operated by fluid-pressure in one of said conducting-pipes and controlling the flow of fluid from one of the conducting-pipes to the radiating devices and from the trap to the other conducting-pipe, substantially as set forth.

9. In a car-heating apparatus, the combination of a radiator, two lines of pipe extending from places or points convenient for the supply of steam and exhaustion of water of condensation, respectively, a trap connected to the radiator for receiving the water of condensation, a valve mechanism having suitable connections to the trap and to the said lines of pipe, the valve or valves of such mechanism being adapted to be shifted in position by steam-pressure introduced through either of said lines of pipe, and a system of ports adapted in either position of the valve or valves to afford a passage-way from the then steam-supply pipe to the radiator and another passage-way from the steam-trap to the opposite pipe, substantially as set forth.

10. In an apparatus for heating cars, the combination of two lines of fluid-conducting pipe, one of said lines being connected with the boiler of the engine, heat-radiating devices located in the cars, a reversible-valve mechanism connected to the lines of pipe and to the heat-radiating devices, a trap connected to the heat-radiating devices and to the valve mechanism, and an ejector-condenser located on the engine and connected to the other line of conducting-pipe and constructed to draw the steam from said line of pipe and to the traps connected therewith and condensing the same to discharge it into the tank of the engine, substantially as set forth.

In testimony whereof I have hereunto set my hand.

GEO. WESTINGHOUSE, JR.

Witnesses:
W. D. UPTEGRAFF,
DARWIN S. WOLCOTT.